No. 745,525. PATENTED DEC. 1, 1903.
A. F. ROCKWELL.
LUBRICATING DEVICE FOR VEHICLE HUBS.
APPLICATION FILED OCT. 6, 1902.

NO MODEL.

Witnesses:
May A. Kenney
Wm. R. Baudenwich

Inventor
A. F. Rockwell
by his attorney,
T. Hart Anderson

No. 745,525.

Patented December 1, 1903.

UNITED STATES PATENT OFFICE.

ALBERT FENIMORE ROCKWELL, OF BRISTOL, CONNECTICUT.

LUBRICATING DEVICE FOR VEHICLE-HUBS.

SPECIFICATION forming part of Letters Patent No. 745,525, dated December 1, 1903.

Application filed October 6, 1902. Serial No. 126,259. (No model.)

*To all whom it may concern:*

Be it known that I, ALBERT FENIMORE ROCKWELL, a citizen of the United States, residing at Bristol, in the county of Hartford and State of Connecticut, have invented certain new and useful Improvements in Lubricating Devices for Vehicle-Hubs; and I do hereby declare the following to be a full, clear, and exact description of the invention, such as will enable others skilled in the art to which it appertains to make and use the same.

The present invention relates to improvements in wheel-vehicles, and more particularly to certain improvements in coasting and braking hubs for said vehicles.

With the introduction of ball-bearings in wheel-hubs, and more particularly with the introduction of brake mechanism within such hubs, it became necessary to freely lubricate the working parts. Heretofore no practicable means has been found for effectually lubricating the brake or friction surfaces without dismantling the hub, and this has especially been true where a thick lubricant, such as vaseline, has been employed.

The object of the present invention is to arrange the axles for use in connection with coasting and braking hubs so that a lubricant may be supplied therethrough directly to the operative parts.

To the above ends the present invention consists of the devices and combinations of devices which will be hereinafter described and claimed.

The present invention is illustrated in the accompanying drawings, in which—

Figure 1:
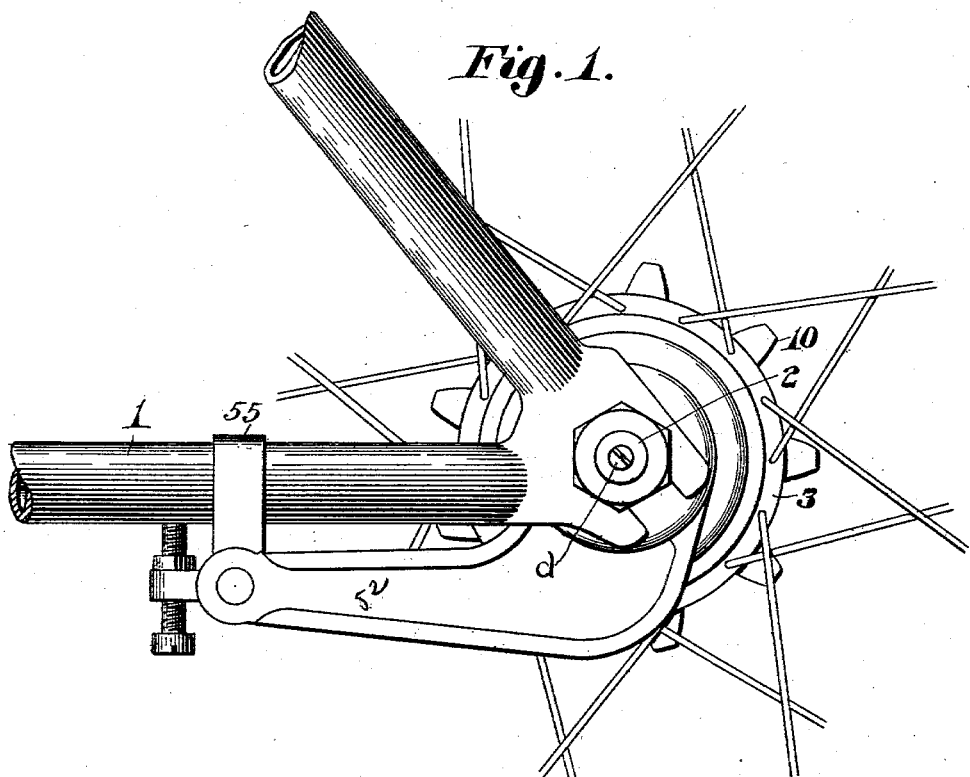
Figure 2:
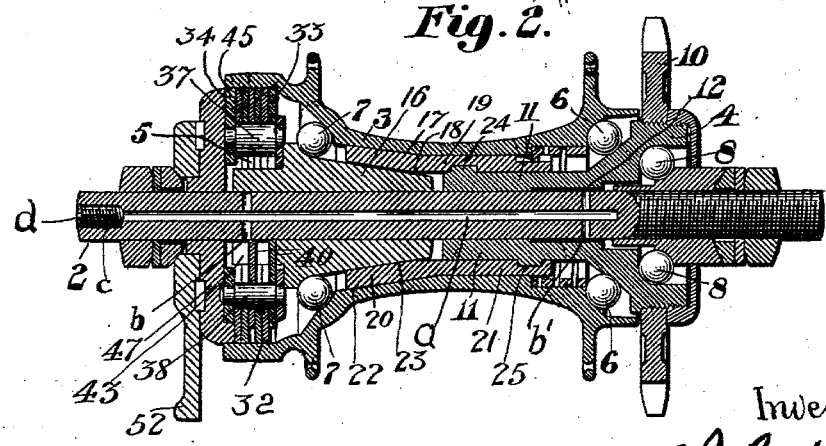

Figure 1 is a side elevation of a hub embodying the present invention and part of a wheel supported in operative position in a bicycle-frame. Fig. 2 is a central longitudinal section through the hub and axle.

Like reference characters indicate corresponding parts throughout the specification and drawings.

In the drawings the invention is shown in connection with the hub of the rear wheel of a bicycle, 1 indicating the rear portion of the frame, 2 indicating the axle, and 3 the hub. A driver 4 is located at the end of the hub and has a sleeve 11 surrounding the axle and extending into the hub. A brake mechanism 5 is located at the opposite end of the hub. Ball-bearings 6 and 7 support the hub 3, and a ball-bearing 8 is between the axle 2 and the driver 4, said driver being a sprocket-wheel or other form of driving device.

The driver is connected with the hub or with the brake mechanism by suitable clutches or is permitted to be disengaged from both, as desired, during the operation of pedaling, braking, and coasting. This clutch mechanism consists of a tapered socket or face 17, formed upon the interior of the hub 3, and a tapered clutch-face 18, formed on the brake-actuator 16, the faces 17 and 18 being substantially parallel and spaced apart, as shown.

A movable clutch member connected with and operated by the driver-sleeve is designed to engage the clutch-face 17 on the hub or the clutch-face 18 on the brake-actuator, accordingly as the driver is turned forward or backward. This clutch member consists of a sleeve 19, which at one end is formed bell-shaped or flaring, as at 20, and at its other end cylindrical, as at 21.

The flaring end of the clutch member is interposed between the clutch-face 17 on the hub and the clutch-face 18 on the brake-actuator and is provided with an external clutch-face 22, designed to engage the clutch-face 17, and an internal clutch-face 23, designed to engage the clutch-face 18.

The movable clutch member is connected to the driver-sleeve by means of an internal spiral groove 25, formed in the cylindrical portion of the clutch member, which engages an external spiral rib 24 on said driver-sleeve. As the driver-sleeve is turned in a forward direction the movable clutch member will be caused to engage the clutch-face on the hub. A backward movement of the sprocket-wheel and driver-sleeve 11 causes the movable clutch member to engage the clutch-face 18 of the brake-actuator and a continuation of said movement causes said brake-actuator to be rotated.

The brake shown in the drawings consists of a series of leaves or springs 32, adapted to be expanded to engage the interior surface of a brake drum or flange on the hub in order to create frictional resistance. In the drawings I have shown six rings, though the number may of course be varied. Each of these rings has a small segment removed, forming thereby a shoulder which is adapted to bear against one of the studs 37 and a shoulder which is engaged by one of the pivoted levers 40, mounted on the studs 38. One end of each of these levers engages with a split ring while the other end thereof engages in a groove 43, formed in the end of the brake-actuator 16. The brake-rings and levers are assembled between plates 33 and 34, and the studs 37 and 38 are riveted or otherwise secured to said plates, whereby a compact construction is formed. The plate 34 has one or more lugs 45, which enter notches in the flange of the adjusting-plate 47. Connected with the adjusting-plate 47 is an arm 52, which extends forwardly and is secured to the frame of the machine by means of a strap 55. It will thus be seen that when the anchoring-arm 52 is secured to the frame the brake-rings 32 will be held against rotation. When the rider of the bicycle wishes to apply the brakes, he applies a backward pressure on the pedals, this pressure being transmitted to the driver-sleeve 11, which in turn moves the movable clutch member laterally, causing the internal clutch-face 23 therefore to engage the clutch-face 18 of the brake-actuator. A continued movement rotates the brake-actuator slightly, causing one set of the walls of the slots 43 to press against the levers 40, turning said levers about their pivots 38. Since the levers 40 engage the free ends of the brake-rings, this movement thereof will expand the rings and cause their outer surface to press against the flange or drum of the hub, exerting thereby a frictional resistance to the movement of the hub. All these parts are similar to those shown in my application, Serial No. 114,860, filed July 9, 1902, and are used merely for the purpose of illustrating, forming no part of the present invention, as any form of hub or hub and brake are contemplated thereby.

The present invention consists in providing the axle 2 with a longitudinal channel or conduit $a$ and with lateral branches $b$ and $b'$, extending from the main conduit to the surface of the axle. In the drawings the channel or conduit $a$ is shown as extending axially from one end of the axle almost to the other; but it is of course understood that a conduit extending entirely through the axle or two conduits extending one from each end of the axle toward the center might be employed to advantage.

The branch conduit $b$ is located near the brake 5, so as to lead the lubricating-grease to the interior of the inclosed brake-rings 32, while the conduit $b'$ opens within the enlarged portion 12 of the interior bore of the driver-sleeve 11.

The outer end of the conduit $a$ is provided with a screw-threaded socket $c$, and a screw-threaded plug $d$, fitting the socket, normally closes the conduit.

When it is desired to supply the hub with a lubricant, the plug $d$ is removed, and the nipple of the lubricant-receptacle may then be screwed into the socket $c$, and when the proper amount of lubricant has been injected the nipple of the lubricant-receptacle may be unscrewed and the plug $d$ put in place, the plug securely closing the end of the conduit and preventing dust from entering or lubricating matter from escaping. It will be seen that the lubricant is forced through the main and auxiliary conduits into the brake mechanism and between the driving sleeve and axle, all the parts of the hub and brake being effectively lubricated.

The main conduit $a$ acts as a reservoir, and a comparatively large effective quantity of lubricant is therefore utilized without causing an overflow and consequent leakage to the exterior of the hub.

A very thick lubricant may be employed, since in applying it it is simply necessary to pack the main conduit and its branches, the heat subsequently generated in the brake and bearings being sufficient to melt the lubricant and cause it to flow from the conduits to such parts.

Having described my invention, I claim as new and desire to protect by Letters Patent of the United States—

1. The combination of a hub having a friction-surface, a brake coöperating therewith and an axle having a lubricant-conduit, said conduit being provided with an outlet adjacent the brake mechanism, substantially as described.

2. The combination of a hub having a friction-surface, a brake coöperating with said surface and an axle having a lubricant-conduit therein extending exterior to the hub, said conduit being provided with an outlet adjacent the brake mechanism, substantially as described.

3. The combination of a hub, inclosed bearings and brake mechanism therein and an axle having a conduit, said conduit being provided with outlets at points adjacent said bearings and brake mechanism.

In testimony whereof I affix my signature in presence of two witnesses.

ALBERT FENIMORE ROCKWELL.

Witnesses:
CHAS. T. TREADWAY,
JOS. D. BROWN.